Oct. 14, 1930.  C. A. WULF  1,778,409
COVER FLANGE AND HOLDER
Filed Oct. 12, 1929
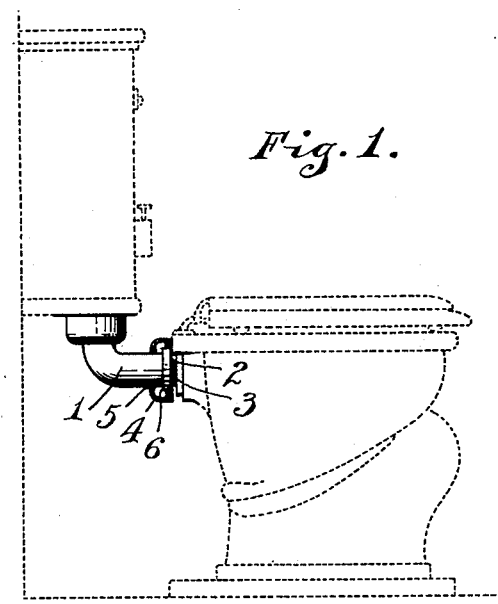
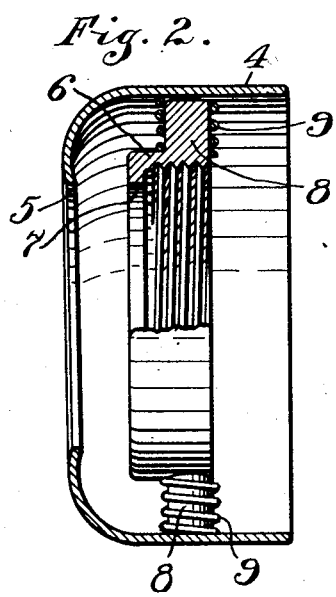
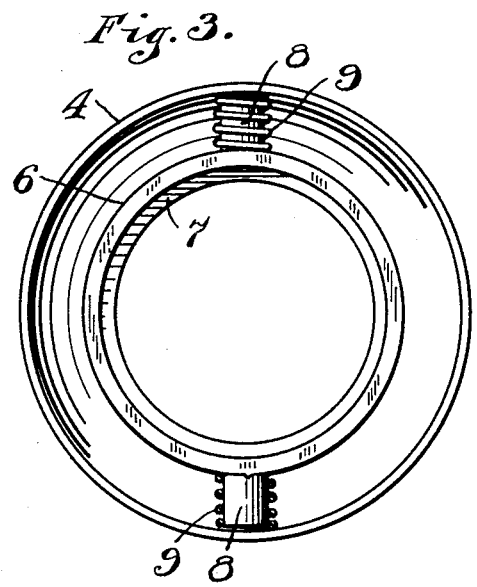
INVENTOR.
Charles A. Wulf,
BY
Hood + Hahn.
ATTORNEYS Patented Oct. 14, 1930

1,778,409

UNITED STATES PATENT OFFICE

CHARLES A. WULF, OF INDIANAPOLIS, INDIANA, ASSIGNOR TO AMERICAN VALVE & ENAMELING CORPORATION, OF INDIANAPOLIS, INDIANA, A CORPORATION OF INDIANA

COVER FLANGE AND HOLDER

Application filed October 12, 1929. Serial No. 399,182.

My invention relates to improvements in cover flanges and holders therefor for pipes and particularly for enameled pipes and elbows.

One of the objects of my invention is to provide a cover flange for enameled pipes and means for supporting the same in position which may be mounted and maintained in position without marring the enamel of the pipe.

For the purpose of disclosing my invention, I have illustrated certain embodiments thereof in the accompanying drawings in which:

Fig. 1 is an elevation in partial section of an application of my invention;

Fig. 2 is a longitudinal sectional view of a flange and holder embodying my invention and Fig. 3 is a front elevation of the flange and holder.

In the drawings, I have illustrated my invention as applied to the supply pipe leading from the flushing tank to a toilet. As shown, this pipe 1 extends from the flushing tank to the toilet and where the joint is made, it is desirable to provide a flange or thimble for covering the joint. Where the pipe joins the tank and toilet the pipe fits within a threaded pipe 2 which is preferably exteriorly threaded as at 3. The cover flange 4 is a hollow cup shaped flange or thimble provided with a central opening 5 through which the coupling pipe passes, and for supporting and maintaining this flange in position, I provide an internally threaded nut 6 adapted to screw thread on the threads 3 and provided at one end with an inturned flange 7. This nut is provided with radially extending bosses 8 around which are arranged coiled springs 9, which are interposed between the walls of the cover flange and the nut to resiliently maintain the cover flange in position. Due to the resilient support of this cover flange when the nut 3 is screwed in position the flange may adjust itself to the pipe and at the same time is not clamped on the pipe and will therefore not injure the enamel. The cover flange itself may be enameled to correspond with the enameling of the pipe.

I claim as my invention the following:

1. A finishing cover flange, comprising a hollow cup-like flange member, having a central opening therein to receive a pipe, and a support therefor comprising a threaded collar having a plurality of radially extending bosses and a coiled spring surrounding at least one of said bosses and upon which the cover flange seats.

2. A finishing cover flange, comprising a hollow cup-like cover flange, provided with a central aperture to receive a pipe and an internally threaded sleeve fixed within said flange having its opening adapted to coincide with the opening in the cover flange and provided with a plurality of radially disposed bosses, and a coiled spring surrounding each of said bosses, and having its outer ends in engagement with the inner wall of the cover flange.

In witness whereof, I CHARLES A. WULF have hereunto set my hand at Indianapolis, Indiana, this 10th day of October, A. D. one thousand nine hundred and twenty nine.

CHARLES A. WULF.